United States Patent
Braudaway et al.

(10) Patent No.: US 6,208,753 B1
(45) Date of Patent: Mar. 27, 2001

(54) QUALITY OF DIGITIZED IMAGES THROUGH POST-SCANNING REREGISTRATION OF THEIR COLOR PLANES

(75) Inventors: Gordon Wesley Braudaway, Yorktown Heights; James Edward Christensen, Cortlandt Manor; Gerhard Robert Thompson, Wappingers Falls, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/032,492

(22) Filed: Feb. 27, 1998

(51) Int. Cl.$^7$ ........................................... G06K 3/00
(52) U.S. Cl. ............................. 382/162; 382/167
(58) Field of Search ................... 382/162, 167, 382/112, 274, 294; 358/525, 264

(56) References Cited

U.S. PATENT DOCUMENTS

| | | | |
|---|---|---|---|
| 3,905,045 | * 9/1975 | Nickel | 382/130 |
| 5,251,271 | * 10/1993 | Fling | 382/162 |
| 5,760,913 | * 6/1998 | Falk | 358/298 |
| 5,909,506 | * 6/1999 | Goto | 382/167 |
| 6,005,968 | * 12/1999 | Granger | 382/162 |

\* cited by examiner

*Primary Examiner*—Yon J. Couso
(74) *Attorney, Agent, or Firm*—Louis P. Herzberg (57) ABSTRACT

A system and process by which misregistration among the pixel components of the several color planes of a color image can be substantially eliminated is presented. In an embodiment, the physical object which comprises the test scene is represented as having features that are uniform squares of alternating black and white color arranged. The digitized color image of the test scene is employed to make measurements of misregistration of scene features in its color planes. A process by which misregistration among the several color planes is measured, and substantially eliminated, is made up of three parts. First, one of the color planes is chosen as a reference plane. The remainder of the color planes are called secondary planes. The relative misregistration of image features in the secondary planes relative to corresponding image features in the reference plane are measured at dispersed pixel locations in the reference plane. Secondly, for each of the secondary planes, an interpolated approximation of the offset of its scene features is computed for each pixel location in the reference plane by using the measured offsets. Thirdly, the color components of each pixel in each of the secondary planes are interpolated using those offsets and the color component values from the neighboring pixels in the same secondary color plane. The interpolated color component values derived from each of the secondary planes are used to form revised color planes and the reregistered image.

15 Claims, 6 Drawing Sheets

QUALITY OF DIGITIZED IMAGES THROUGH POST-SCANNING REREGISTRATION OF THEIR COLOR PLANES

FIELD OF THE INVENTION

This application relates to the field of digitized imaging and is more specifically directed to improving scanned image quality.

BACKGROUND OF THE INVENTION

The process of scanning and digitizing a physical scene to form a digitized color image begins by optically focusing the physical scene onto an imaging plane. The imaging plane is spatially divided into a two-dimensional array of small, uniform elements called pixels. The color scanning process typically involves a scanning device that performs several passes of a light sensitive device over the imaging plane to measure the average intensity of irradiated light at each pixel location. On each pass, the light sensitive device is covered by a different colored filter having a carefully chosen spectral transmittance. At least two passes are typically involved. Each pass of the light sensitive device over the imaging plane produces a color plane. Associated with each pixel in each color plane is an integer called a color component. The color component is used to record the average value of the digitized intensity of irradiated light measured by the light sensitive device. The plurality of integers in corresponding positions in the several color planes make up the family of color components of the pixel. The plurality of pixel color components for all color planes make up the digitized image.

Some present-day image scanning devices are capable of measuring and recording the integer values of all color components of each pixel during a single pass over the imaging plane. Still other devices are capable of measuring and recording the values of all color components of all pixels simultaneously. The net result, however, is the same. Each device produces the values for the several color planes that represent the digitized color image.

In what follows, whenever reference is made to color planes, it is understood to include any number of color planes used by a particular image digitizing technique to define pixel color components.

A digitized image is recognizable as an image by a human viewer only when the individual pixel color components are displayed as dots of colored light on a display, or as dots of colored inks or dyes on a hardcopy. Pixels are normally chosen to be spaced so closely as to be unresolvable by a human visual system. This results in the fusion of neighboring pixels by the human visual system into a representation of the original physical scene.

The optical paths between the physical scene and the light sensitive device are different for each of the color planes.

This is because a different colored filter is used for each color plane. Each of these filters has minor variations in its thickness, index or refraction, homogeneity, and in its physical placement and alignment. These variations can not be entirely eliminated with the p resent state of the art. In addition, minor mechanical variations occur in scanning devices that typically involve physical movement of either the scene or the light sensitive device, or both. These minor mechanical variations can not be entirely eliminated with the present state of the art. Any or all of these variations, although minimized by careful manufacture of the scanner, cause misregistration among the several color planes. Thus features of an object in the physical scene appear in slightly different pixel positions in each of the several color planes. Misregistration of the color planes produces the sensation of sub-optimal focus to a human viewer when the image is displayed at its full resolution. It also produces "false-color" fringes at the edges of features in the image where an abrupt color change occurs. This is especially evident when the digitized image is enlarged.

A detailed description of color component values is found in G. Wyszecki and W. S. Styles, "Color Science: Concepts and Methods, Quantitative Data and Formulae," John Wiley & Sons, Inc. (2nd ed.), New York, 1982, pp. 164–169, incorporated here in by reference in its entirety. The CIE 1931 standard specifies three particular reference stimuli. The stimuli are radiometric quantities, and as such are expressed in radiometric units such as watts. Grassmann's law, on which nearly all of modern colorimetry is based, requires use of those three specific reference stimuli, or three others that are distinct linear combinations of them. This is discussed in D. B. Judd and G. Wyszecki, "Color in Business, Science, and Industry," (3rd ed.), John Wiley & Sons, Inc., New York, 1975, pp. 45–47, incorporated herein by reference in its entirety. Also incorporated herein by reference in its entirety, is a paper by F. Mintzer and G. W. Braudaway, "Processing Color Images while Preserving Their Color," Proceedings of the Ninth Workshop on Image and Multidimensional Signal Processing, Mar. 3–6, 1996, Belize City, Belize, pp. 106–107.

SUMMARY OF THE INVENTION

The present invention provides an article of manufacture, system and process to be applied to the several color planes representing an image, by which misregistration among the pixel components in the various color planes can be measured and, in large part, removed. This brings the several planes into more substantially perfect registration. This process is herein called reregistration.

In one aspect the present invention provides a process by which misregistration among the pixel components of the several color planes of a color image can be substantially eliminated. The process begins with the scanning of a test scene. The physical object which comprises the test scene typically has features that are uniform squares of alternating lack and white color arranged, for instance, in a grid forming a black and white checkerboard. Other test scene grids ay be used. The digitized color image of the test scene is employed to make measurements of misregistration of scene features in its color planes.

In an example embodiment, a process by which misregistration among the several color planes is measured, and substantially eliminated, is made up of three parts, described as follows:

Firstly, one of the color planes is chosen as a reference plane. The remainder of the color planes are denoted secondary planes. The digitized image must have at least two color planes, that is, one reference plane and at least one secondary plane. The relative misregistration of image features in each secondary plane relative to corresponding image features in the reference plane is measured at several reference points at dispersed pixel locations in the reference plane. Typically, four or more pixel locations are used. Each measured misregistration includes a two-dimensional offset of an image feature in a secondary plane with respect to the corresponding feature in the reference plane. One type of two-dimensional offset is a horizontal and vertical offset.

Secondly, for each of the secondary planes, an interpolated approximation of the horizontal and vertical offset of scene features is computed for every pixel location in the reference plane by using the vertical and horizontal offsets measured at the four or more dispersed pixel locations, Thirdly, using the approximate feature offsets computed as above, the color components of each pixel in each of the secondary planes can be interpolated using those offsets and the color component values from the neighboring pixels in the same secondary color plane.

The interpolated color component values derived from each of the secondary planes are used to form revised color planes. The revised planes are used in place of the secondary planes and in conjunction with the reference plane to form the reregistered image.

The small systematic imperfections inherent in even the best scanners tend to produce very repeatable misregistrations. Thus, once a correction for misregistration has been computed for the test scene, it can be applied in an identical manner to any other physical scene that is focused in a like manner on the imaging plane of a particular scanner. In this sense, the image of the test scene and its reregistration parameters serve as a calibration for other images captured by that scanner.

BRIEF DESCRIPTION OF THE DRAWING

These and other objects, features, and advantages of the present invention will become apparent upon further consideration of the following detailed description of the invention when read in conjunction with the drawing figures, in which.

DESCRIPTION OF THE INVENTION

The present invention provides a process by which misregistration among the pixel components of the several color planes of a color image can be substantially eliminated. The process begins with the scanning of a test scene. In an embodiment, the physical object which comprises the test scene has features that are uniform squares of alternating black and white color arranged, for instance, in a grid forming a black and white checkerboard. If the misregistration of features is anticipated to be less than the width and height of one pixel, the size of the square features in the test scene is usually such that when the physical object is focused onto and completely covers the imaging plane, the squares should have an appropriate height and width. In an embodiment, the height and width are not less than five pixels nor more than ten pixels. If the misregistration of features is anticipated to be equal to or more than the width and height of one pixel, the size of the square features focused onto the imaging plane is usually chosen to be proportionally larger. The digitized color image of the test scene is used to make measurements of misregistration of scene features in the image's color planes. Other test scene grids may be used with similar advantage.

In an embodiment, the color component values express the intensity of a visual stimulus in terms of the CIE 1931 Standard Colorimetric Observer and Coordinate System tristimulus components X, Y and Z that correspond to a matching mixture of three reference stimuli. A linear color component interpolation method, such as an areal method, preserves the average color of pixels in a very small area of the image. It is noted that other forms of interpolation are also usable when appropriate or suitable to produce similar results. This is accomplished by preserving the ratios of $\underline{X}$:$\underline{Y}$ and $\underline{Z}$:$\underline{Y}$ in the very small area, where $\underline{X},\underline{Y}$, and $\underline{Z}$ refer to the average values of X,Y and Z of the color components taken over that very small area. A pixel represented in any nonlinear color space, such as the color space of the subtractive dyes Cyan, Magenta, Yellow and Black (CMYK) used in color printing, is translated to the X,Y,Z color space (or to a color space linearly related to it) before the color component values are modified. Those skilled in the art will recognize that other color spaces not linearly related to the X,Y,Z can be used with varying degrees of color accuracy preservation.

Figure 1:
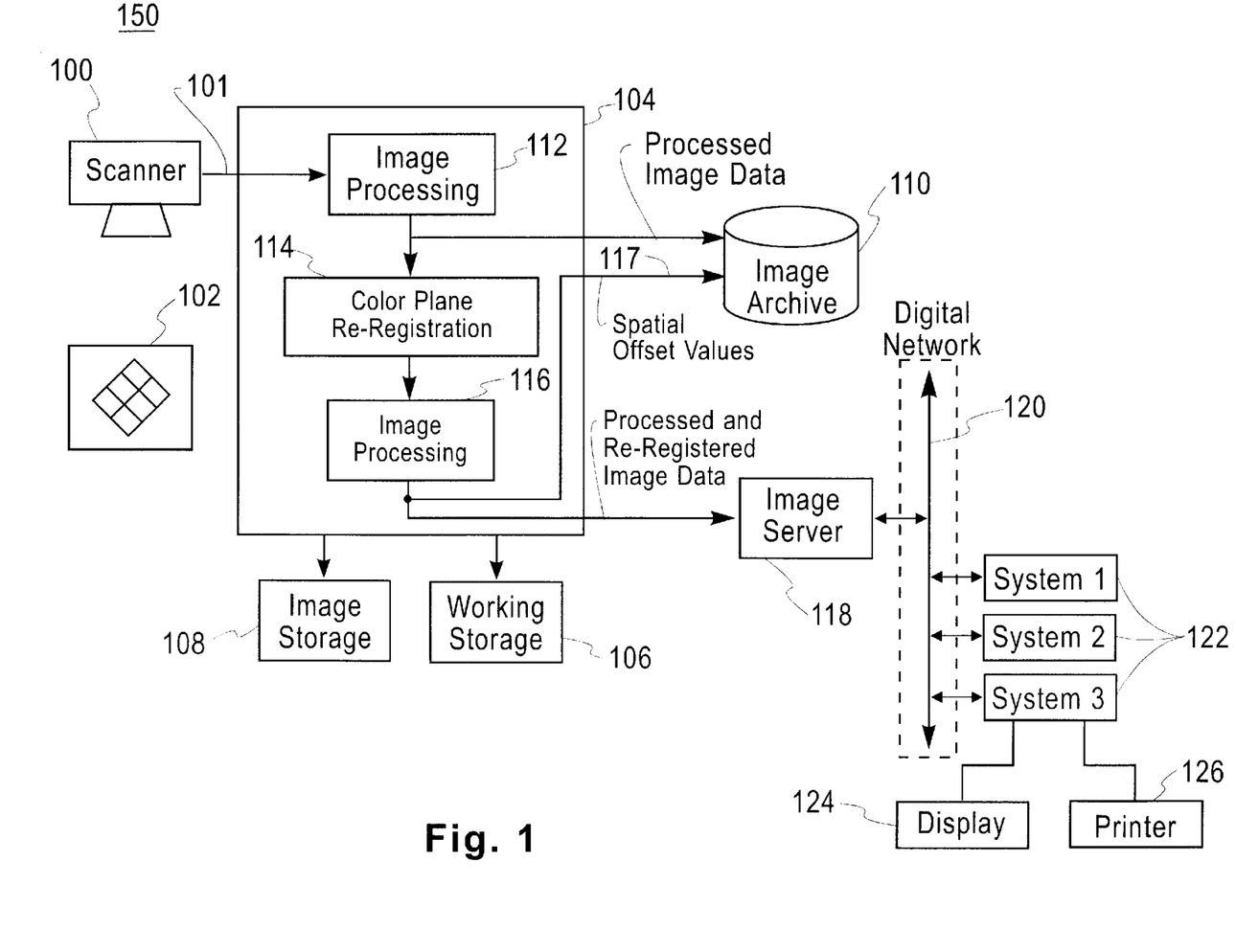
FIG. 1 shows a block diagram of an image capture and distribution system suitable for use in accordance with an embodiment of the present invention.

FIG. 1 shows a block diagram of a system embodiment for improving the quality of digitized images through post-scanning reregistration of their color planes in accordance with the present invention. FIG. 1 shows an example of an image capture and distribution system 150. It includes a scanner 100 which captures image data 101 from a physical scene 102. The physical scene 102 is typically a painting, a photograph, a physical object and its surrounds, or a test chart. The scanner 100 sends original image data 101 to a digital computer 104. The computer 104 includes a working storage 106 that is typically embodied in the computer's random access memory, an image storage system 108 that is often a conventional hard disk drive, and an image archive 110 that can be a tape or disk storage. The computer 104 also includes a number of modules which are usually implemented in software. These include a front-end image processor 112 that performs image processing such as scaling and enhancement of the image data provided by the scanner 100. It also includes color plane reregistration controller 114 operating in accordance with the principles of the present invention, and back-end image processing software 116 that performs other processing functions. These other processing functions include compression of the image and storing spatial offset value data 117 for image color plane reregistration. The offset value data 117 is used on other digitized images scanned by the scanner 100. Most often, the unprocessed or front-end digitized original image data 101 is sent to the image archive 110 for preservation in unaltered form.

An alternate embodiment has the original image data in digitized form 101 and color plane spatial offset value data 117 already available without requiring a scanner 100. The color plane reregistration software 114 applies reregistration to the color planes of the digitized image 101 in accordance with the principles of the present invention. The reregistration process can also be performed on a copy of an archived image or on other scanned and processed image data which has been loaded in whole or in part, into the computer's working storage 106.

The processed, reregistered and compressed image data produced by the combination of modules 112, 114, 116 is sent from the working storage 106 or image storage 108 to an image server 118 that is connected to a digital network 120. When appropriate, the digital network is interconnected with a Local Area Network (LAN), a Wide Area Network (WAN) such as the Internet, or both. Other systems 122 connected to the digital network 120 can request and receive images stored on the image server 118 via the digital network 120. In some cases, the systems can then display the received images on a display device 124 and/or print the images on a graphics capable printer 126. Those skilled in the art will recognize that there are many other system configurations in which the present invention could be employed.

The process by which misregistration among the several color planes can be measured and substantially eliminated is separated into three parts, described in the following three subsections.

MEASURING THE MISREGISTRATION AT A FEW SELECTED PIXEL LOCATIONS

An example embodiment of this invention uses three color planes. One of the three planes is chosen to be the reference plane. The remainder of the color planes are called secondary planes. Although which plane is chosen as the reference plane is not critical to the correct functioning of the invention, it is customary to choose the plane containing the color component Y, or that component most nearly equal to Y (such as G in a RGB red-green-blue color space). Each measured misregistration includes a horizontal and vertical offset of an image feature in a secondary plane relative to the corresponding feature in the reference plane. The offsets are average offsets over small areas of the image centered at reference points that are generally widely dispersed pixel locations. In a particular embodiment, the misregistration of features in the two secondary planes relative to the those in the reference plane are measured at only four reference points at dispersed pixel locations in the reference plane. A good choice is to use the four pixel locations centered in small partitions of groups of pixels near the four corners of the rectangular image.

Figure 2:
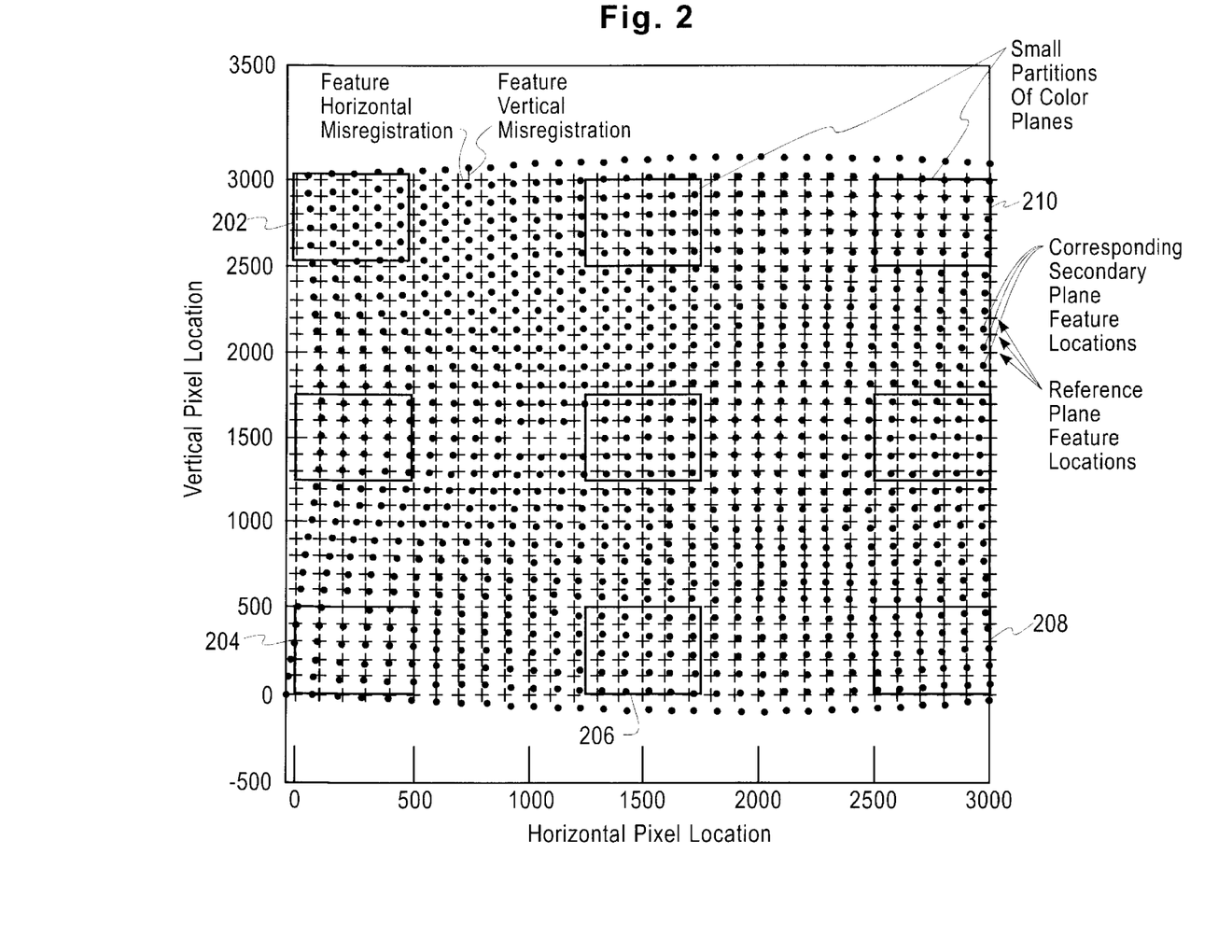
FIG. 2 shows a typical case of misregistration of features in a secondary plane relative to a reference plane.

FIG. 2 shows an exaggerated case of misregistration of features in a secondary plane relative to the same features in the reference plane. It also shows small partitions 202–210 of groups of pixels. In a particular embodiment of the present invention, only the corner partitions 202, 204, 208 and 210 are used.

In an embodiment of the present invention, an example of measurement of misregistration values is accomplished using forward and reverse discrete Fourier transforms operating on small partitions of the color planes. Let each of the color planes have width M>>256 and height N>>256. Let $I(\mu,\nu,\kappa)$ represent the three color planes of the digitized image, where $\kappa=0,1,2$ specifies the particular color plane, and $0 \leq \mu \leq M-1$ and $0 \leq \nu \leq N-1$ specify the row and column indices of pixel locations in each of the planes. Let the image planes be partitioned into a number of small partitions. In an embodiment wherein the number of partitions is equal to four, let the four partitions of the image be $P(i,j,\kappa,\rho)=I(i+i_B,j+j_B,\kappa)$, where $1 \leq \rho \leq 4$ refers to the particular partition. For specific values of $\rho$, let $i,j,i_B$ and $j_B$ have the ranges and values in Table 1.

TABLE 1

| Partition ρ | Range of i | Range of j | Bias $i_B$ | Bias $j_B$ |
|---|---|---|---|---|
| 1 | 0, ..., 255 | 0, ..., 255 | 0 | 0 |
| 2 | 0, ..., 255 | 0, ..., 255 | 0 | N-256 |
| 3 | 0, ..., 255 | 0, ..., 255 | M-256 | 0 |
| 4 | 0, ..., 255 | 0, ..., 255 | M-256 | N-256 |

The four partitions are thus defined to be $256^2$ pixel squares at the four corners of each of the color planes. Since there are three color planes, each having a particular partition at the four corners, there are twelve partitions.

Let the planes $p(\sigma,\tau,\kappa,\rho)$ be the discrete Fourier transforms of $P(i,j,\kappa,\rho)$. Since the values of the color components $P(i,j,\kappa,\rho)$ are real integers, values of the elements of $p(\sigma,\tau,\kappa,\rho)$ will be complex numbers. Let $\kappa=0$ represent the reference plane. Let $c(\sigma,\tau,\kappa,\rho)$ represent the Fourier transforms of cross-correlation surfaces of the reference partitions with each of the two secondary plane partitions. Then for all $\sigma$ and $\tau$, $c(\sigma,\tau,\kappa,\rho)=p(\sigma,\tau,0,\rho) \times \underline{p}(\sigma,\tau,\kappa,\rho)$, where $\kappa$ is restricted to be 1 or 2, and $\underline{p}(\sigma,\tau,\kappa,\rho)$ are planes whose elements are the complex conjugates of the elements of $p(\sigma,\tau,\kappa,\rho)$. The operator $p \times \underline{p}$ signifies multiplication of complex elements. But before the cross-correlation surfaces are computed, the coordinates $\sigma$ and $\tau$ are expanded by a power of two to form the coordinates s and t. A particular embodiment uses $2^2$. The planes $p(\sigma,\tau,\kappa,\rho)$ thus become $p(s,t,\kappa,\rho)$, and the added elements of the larger planes are filled with zeros. This process is called zero-padding. Finally, the eight cross-correlation surfaces $C(m,n,\kappa,\rho)$ are computed as the discrete reverse Fourier transforms of $c(s,t,\kappa,\rho)$. It should be noted that the cross-correlation surfaces are 1024 pixels wide and 1024 pixels high, based on the ranges of i and j stated above in Table 1. The increase in size is a direct result of the zero padding. The purpose of this deliberate increase is to facilitate more accurate interpolation of the locations of the peaks in each cross-correlation surface.

Each of the two sets of cross-correlation surfaces, $C(m,n,1,\rho)$ and $C(m,n,2,\rho)$, contains information about the relative alignment of features in the reference color plane partitions with the same features in corresponding partitions of color planes 1 and 2, respectively. Since the physical scene imaged was a checkerboard, each cross-correlation surface will have a regular grid of peaks. The peak of interest in each surface is that closest to its origin, where the origin is the location at which m and n are 0. That peak is called the fundamental peak. The horizontal and vertical offsets, referred to as $\underline{m}(\kappa,n)$ and $\underline{n}(\kappa,n)$, respectively, of the fundamental peak relative to the origin are four times the average horizontal and vertical offsets of features in the specific secondary plane relative to the same features in the reference plane. The factor four is a consequence of the zero-padding which has caused the coordinates of the cross-correlation surfaces to be magnified. Since, in any good scanner design, misregistration is ordinarily less than one pixel, a location-by-location search for a maximum $C(m,n,\kappa,\rho)$ in the vicinity of the origin will determine the coordinates of the location nearest the fundamental peak.

Figure 3:
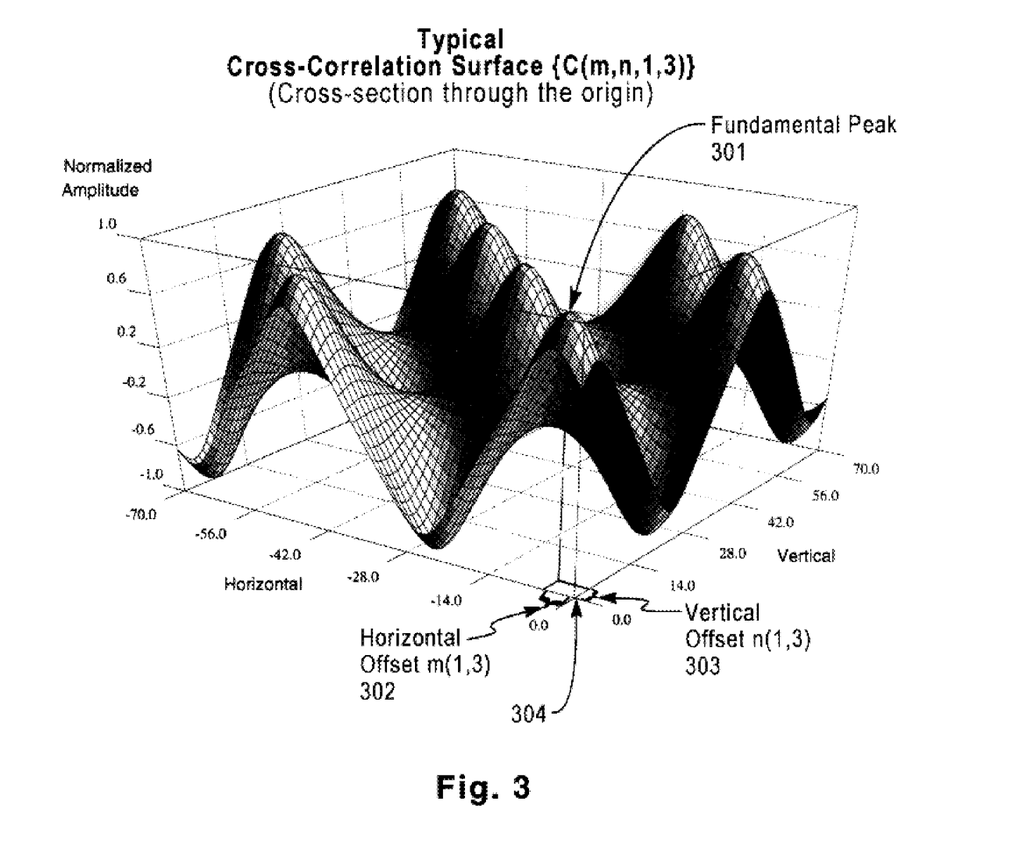
FIG. 3 shows a typical cross-correlation surface graph.

The cross-section of a typical cross-correlation surface is shown in to FIG. 3. The fundamental peak, 301, is shown as having a horizontal offset, 302, and vertical offset, 303, relative to the origin of the cross-correlation surface, 304.

The values of the horizontal and vertical coordinates of the fundamental peak relative to the origin of its respective correlation surface are found by interpolation. The mathematical form used for interpolation is an elliptic paraboloid.

The general formula of the elliptic paraboloid is $\alpha x^2+\beta x+ y^2+\delta y+\eta=z$. For this formula, the variables x and y are associated with the row and column indices, respectively, of the cross-correlation surfaces, and z is associated with the value of the cross-correlation surface element at those indices. Thus, if $m_P$ and $n_P$ are the row and column indices closest to the fundamental peak in any one of the eight cross-correlation surfaces, then $\alpha(\kappa,\rho)m_p^2+\beta(\kappa,\rho)m_p+\gamma(\kappa,\rho)n_p^2+\delta(\kappa,\rho)n_p+\eta(\kappa,\rho)+C(m_p, n_p,\kappa,\rho)$, where $\kappa$ refers to one of the two secondary planes and the subscript $\rho$ refers to one of the four color plane partition positions, as before.

The eight sets of coefficients $\alpha(\kappa,\rho)$, $\beta(\kappa,\rho)$, $\gamma(\kappa,\rho)$, and $\delta(\kappa,\rho)$ can be computed by inverting the following eight sets of simultaneous linear equation, represented in matrix form as:

$$C=NA$$

where the matrices are:

$$C = \begin{vmatrix} C(m_P-1, n_P-1, k, \rho) \\ C(m_P, n_P-1, k, \rho) \\ C(m_P+1, n_P-1, k, \rho) \\ C(m_P-1, n_P, k, \rho) \\ C(m_P, n_P, k, \rho) \\ C(m_P+1, n_P, k, \rho) \\ C(m_P-1, n_P+1, k, \rho) \\ C(m_P, n_P+1, k, \rho) \\ C(m_P+1, n_P+1, k, \rho) \end{vmatrix},$$

$$N = \begin{vmatrix} (m_P-1)^2 & m_P-1 & (n_P-1)^2 & n_P-1 & 1 \\ m_P^2 & m_P & (n_P-1)^2 & n_P-1 & 1 \\ (m_P+1)^2 & m_P+1 & (n_P-1)^2 & n_P-1 & 1 \\ (m_P-1)^2 & m_P-1 & n_P^2 & n_P & 1 \\ m_P^2 & m_P & n_P^2 & n_P & 1 \\ (m_P+1)^2 & m_P+1 & n_P^2 & n_P & 1 \\ (m_P-1)^2 & m_P-1 & (n_P+1)^2 & n_P+1 & 1 \\ m_P^2 & m_P & (n_P+1)^2 & n_P+1 & 1 \\ (m_P+1)^2 & m_P+1 & (n_P+1)^2 & n_P+1 & 1 \end{vmatrix}$$

$$A = \begin{vmatrix} \alpha(k,\rho) \\ \beta(k,\rho) \\ \gamma(k,\rho) \\ \delta(k,\rho) \\ \eta(k,\rho) \end{vmatrix}$$

Note that equations involving the location nearest the fundamental peak at $m_P,n_P$ and its eight nearest neighbors are used. Since only five coefficients need to be solved for, each of the sets of simultaneous linear equations is overdetermined. Therefore, a solution in the least-squares sense is used. That solution is:

$$A=[N^T N]^{-1} N^T C$$

where $N^T$ is the matrix transpose of N. From each of the eight sets of coefficients $\alpha(\kappa,\rho)$, $\beta(\kappa,\rho)$, $\gamma(\kappa,\rho)$, and $\delta(\kappa,\rho)$, the interpolated horizontal and vertical offsets, $\underline{m}(\kappa,\rho)$ and $\underline{n}(\kappa,\rho)$, of the fundamental peaks of the cross correlation surfaces are given by $\underline{m}(\kappa,\rho)=-\beta(\kappa,\rho)/2\alpha(\kappa,\rho)$ and $\underline{n}(\kappa,\rho)=-\delta(\kappa,\rho)/2\gamma(\kappa,\rho)$. In a particular embodiment, the values $\underline{m}(\kappa,\rho)$ and $\underline{n}(\kappa,\rho)$ are four times as large as the average relative horizontal and vertical offsets of features in the two secondary planes relative to the same features in the reference plane. This is a direct consequence of the enlargement that occurs because of zero padding, as detailed above.

Figure 4:
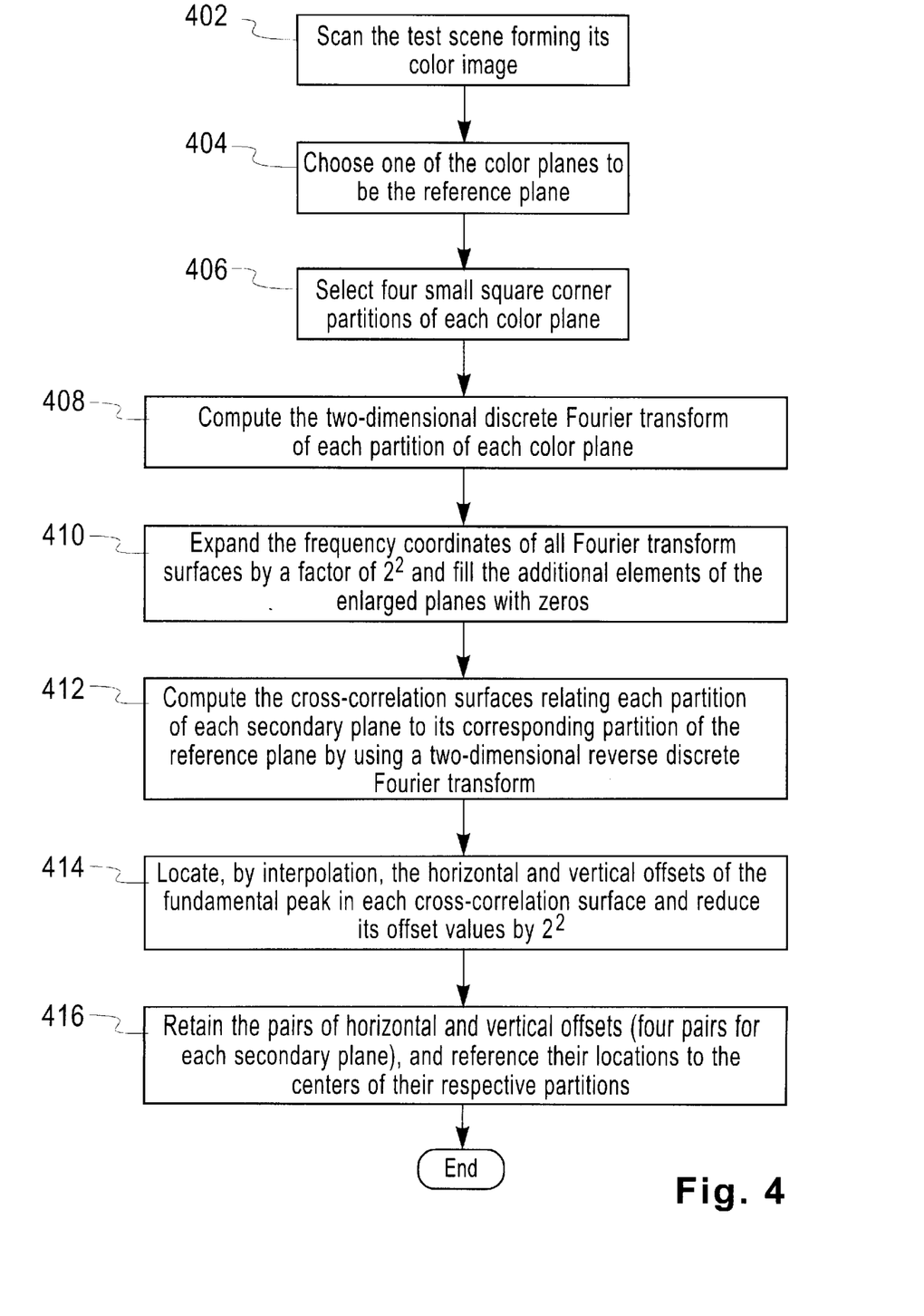
FIG. 4 shows an example of an embodiment of the present invention having pairs of horizontal and vertical offsets at four dispersed pixel locations in the reference plane.

In one embodiment, pairs of horizontal and vertical offsets at four dispersed pixel locations in the reference plane are measured following steps 402–416 shown in FIG. 4. First, a test scene having a black and white checkerboard pattern is focused on the image plane of a scanning device and a color image is scanned and recorded, 402. One of the color planes of the scanned image is chosen to be the reference plane, 404. Four small square partitions of the pixels in each plane are chosen, one partition at each corner of each plane, so two adjacent sides of each partition abut the edges of the plane, 406. As before, the partitions are referred to as $P(i,j,\kappa,\rho)$. The two-dimensional discrete Fourier transform of each partition of each plane is computed, 408, and referred to as before as $p(\sigma,\tau,\kappa,\rho)$. The coordinates $\sigma$ and $\tau$ are expanded by $2^2$ to form the coordinates s and t, and the additional elements of the enlarged planes are filled with zeros, 410. The eight cross-correlation surfaces, referred to before as $C(m,n,\kappa,\rho)$, relating each partition of each secondary plane to its corresponding partition in the reference plane, are computed as the discrete two-dimensional reverse Fourier transforms of $c(s,t,\kappa,\rho)$, 412. The horizontal and vertical offsets of the fundamental peak in each cross-correlation surface are located by interpolation, and the offset values are reduced by $2^2$, 414. The horizontal and vertical offset pairs, referred to before as $\underline{m}(\kappa,\rho)$ and $\underline{n}(\kappa,\rho)$, are retained, with the position of each pair referenced to the center pixel of its corresponding small partition, 416.

DETERMINING THE APPROXIMATE MISREGISTRATION AT ALL PIXEL LOCATIONS

In an embodiment of the present invention, a set of four coefficients of a bilinear interpolation formula is computed for each of the secondary planes and for each vertical and horizontal offset. Each set of coefficients is computed using the appropriate values of offsets measured at the four reference points at the dispersed pixel locations and the coordinates of those dispersed locations in the reference plane. In a particular embodiment, there are four sets computed, one for each of the two secondary planes and for each horizontal and vertical offset of pixel misregistration. By using a bilinear interpolation formula with the appropriate set of coefficients, an approximation of the horizontal and vertical offset of scene features in each of the secondary planes can be computed for every pixel location in each reference plane.

For a particular embodiment, the average values of horizontal and vertical misregistration of features in each of the two secondary planes measured at each of four locations in the color planes are placed at the center of each of the partitions of the reference plane; that is, at pixel locations having the coordinate pairs (128,128), (128,N-127), (M-127, 128), and (M-127,N-127). It is then possible to determine for each of the secondary planes a linearly interpolated measure of horizontal and vertical misregistration corresponding to every pixel location in the reference plane using a bilinear interpolation formula. The general bilinear formula is $\xi x+\psi xy+\zeta y+\lambda=z$. For this formula, the variables x and y are associated with the row and column indices, respectively, of pixel locations in the reference plane, and z is associated with the horizontal and vertical offsets, $\underline{m}(\kappa,\rho)$ and $\underline{n}(\kappa,\rho)$, of the fundamental peaks of the cross correlation surfaces for each partition. With these associations, the following matrix equations result:

$$\Gamma_h = X^{-1} M_h$$

$$\Gamma_v = X^{-1} M_v$$

where:

$$X = \begin{vmatrix} 128 & 128 \cdot 128 & 128 & 1 \\ 128 & 128 \cdot (N-127) & N-127 & 1 \\ M-127 & 128 \cdot (M-127) & 128 & 1 \\ M-127 & (M-127) \cdot (N-127) & N-127 & 1 \end{vmatrix}$$

$$\Gamma_h = \begin{vmatrix} \xi_h(k) \\ \psi_h(k) \\ \zeta_h(k) \\ \lambda_h(k) \end{vmatrix}, \quad \Gamma_v = \begin{vmatrix} \xi_v(k) \\ \psi_v(k) \\ \zeta_v(k) \\ \lambda_v(k) \end{vmatrix}, \quad M_h = \begin{vmatrix} \underline{m}(k,1) \\ \underline{m}(k,2) \\ \underline{m}(k,3) \\ \underline{m}(k,4) \end{vmatrix}, \quad M_v = \begin{vmatrix} \underline{n}(k,1) \\ \underline{n}(k,2) \\ \underline{n}(k,3) \\ \underline{n}(k,4) \end{vmatrix}$$

The approximate interpolated horizontal and vertical offsets, $h(\mu,\nu,\kappa)$ and $v(\mu,\nu,\kappa)$, respectively, of features in a secondary plane relative to corresponding features in the reference plane, for any value of $0 \leq \mu \leq M-1$ and $0 \leq \nu \leq N-1$, can now be computed from:

$$h(\mu,\nu,\kappa) = \xi_h(\kappa)\mu + \psi_h(\kappa)\mu\nu + \zeta_h(\kappa)\nu + \gamma_h(\kappa)$$

$$v(\mu,\nu,\kappa) = \xi_v(\kappa)\mu + \psi_v(\kappa)\mu\nu + \zeta_v(\kappa)\nu + \gamma_v(\kappa)$$

where $\kappa=1$ or $2$ designates a particular secondary plane. To those skilled in the art it will be obvious that $h(\mu,\nu,\kappa)$ and $v(\mu,\nu,\kappa)$ are zero, if $\kappa=0$, for all values of $\mu$ and $\nu$.

Those skilled in the art will also recognize that measurements of the values of horizontal and vertical misregistration of features in each of the two secondary planes could have been made at many more than the four locations used in the example embodiment, and the additional measurements could have been used in abutted groups of four. In addition, other known linear and nonlinear interpolation methods that accommodate more complex distortion of features in the secondary planes could have been used to estimate $h(\mu,\nu,\kappa)$ and $v(\mu,\nu,\kappa)$. The net result of any of these methods, however, is the estimation of $h(\mu,\nu,\kappa)$ and $v(\mu,\nu,\kappa)$ for all values of $\rho$ and $\nu$.

Figure 5:
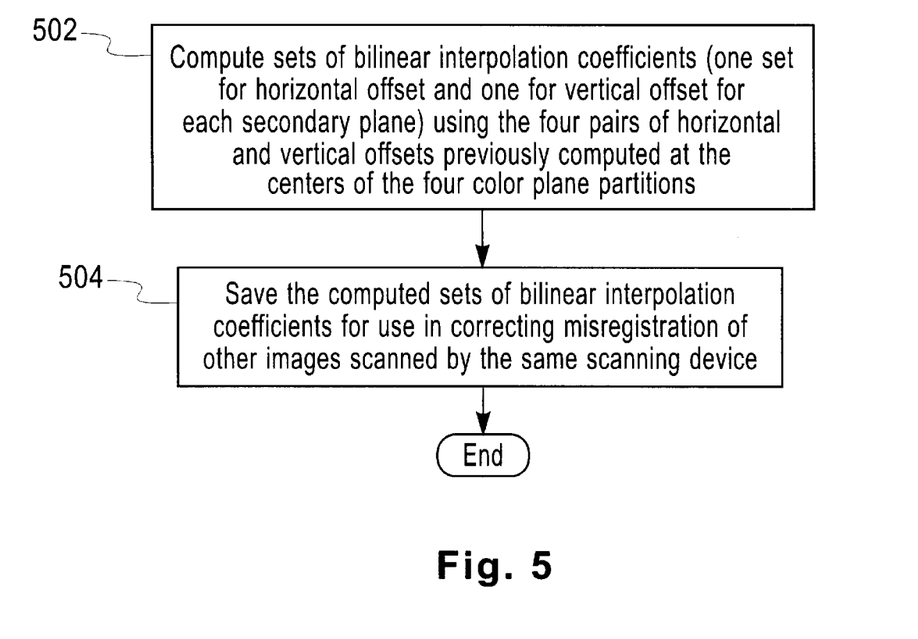
FIG. 5 shows an example of an embodiment for determining the approximate misregistration at all pixel locations in accordance with the present invention.

FIG. 5 shows an embodiment for determining the approximate misregistration at all pixel locations. First, sets of coefficients for a bilinear interpolation formula are computed, one set for each color plane and for each offset, referred to before as $\xi_h(\kappa)$, $\psi_h(\kappa)$, $\zeta_h(\kappa)$, and $\lambda_h(\kappa)$ for the horizontal offsets and $\xi_v(\kappa)$, $\psi_v(\kappa)$, $\zeta_v(\kappa)$, and $\lambda_v(\kappa)$ for the vertical offsets, 502. These sets of coefficients are saved for use to compute the approximate offsets at every pixel location, referred to before as $h(\mu,\nu,\kappa)$ and $v(\mu,\nu,\kappa)$. This is so for the image of the test scene and any other image scanned by the scanning device under similar conditions, 504. Under similar conditions means that other physical scenes are optically focused onto the imaging plane using the same scanner and similar settings for such items as focal distance, lens aperture and colored filters.

ADJUSTING COLOR PIXEL VALUES IN THE SECONDARY PLANES

Once the approximate horizontal and vertical offsets are determined at every pixel location in each secondary plane relative to pixel locations in the reference plane, it is possible to determine a revised color component value in a revised secondary plane that corresponds to the pixel location in the reference plane. This is true whether the image is that of the test scene or any other image scanned by the scanning device under similar conditions. The effect of this interpolation is to reregister features in the secondary planes with corresponding features in the reference plane. In an example embodiment, interpolation is accomplished using a two-dimensional areal interpolation formula or any other appropriate interpolation scheme. The coordinates of compensating pixel locations in a secondary plane, in terms of the misregistered coordinates of pixels in that secondary planes, are given by $\mu-h(\mu,\nu,\kappa)$ and $\nu-v(\mu,\nu,\kappa)$. At each of the compensating pixel locations in the secondary plane thus computed, the three pixel locations in the secondary plane that enclose it in a triangle are chosen.

To determine the coordinates of the three enclosing pixel locations, let $\mu_c$ and $v_c$ be the greatest integers that are less than or equal to $\mu-h(\mu,\nu,\kappa)$ and $\nu-v(\mu,\nu,\kappa)$, respectively. These represent coordinates of the lower left corner of a square. The three enclosing pixel locations, $p_1,q_1$, $p_2,q_2$, and $p_3,q_3$, can now be selected; the choices are shown in Table 2.

TABLE 2

| $p_1,q_1 =$<br>$p_2,q_2 =$<br>$p_3,q_3 =$ | for<br>$\mu - h(\mu,\nu,k) - \mu_c$<br>$<0.5$ | for<br>$\mu - h(\mu,\nu,k) - \mu_c$<br>$\geq 0.5$ |
|---|---|---|
| for<br>$\nu - v(\mu,\nu,k) - v_c$<br>$<0.5$ | $\mu_c,v_c$<br>$\mu_c+1,v_c$<br>$\mu_c,v_c+1$ | $\mu_c+1,v_c$<br>$\mu_c+1,v_c+1$<br>$\mu_c,v_c+1$ |
| for<br>$\nu - v(\mu,\nu,k) - v_c$<br>$\geq 0.5$ | $\mu_c,v_c$<br>$\mu_c,v_c+1$<br>$\mu_c+1,v_c+1$ | $\mu_c,v_c+1$<br>$\mu_c+1,v_c+1$<br>$\mu_c+1,v_c$ |

In the example, the areal interpolation formula used corresponds to approximating the surface defined by a function of two variables, in this case variables $\mu$ and $\nu$, as the plane through three points on the surface, in this case $I(\mu,\nu,\kappa)$, corresponding to the vertices of the enclosing triangle. The interpolated values, $I^*(\mu,\nu,\kappa)$, for $\kappa=1$ and $2$, are given by the following matrix equation:

$$\Xi = PZ^{-1}\Phi$$

where:

$$Z = \begin{vmatrix} p_1 - \mu_C & p_2 - \mu_C & p_3 - \mu_C \\ q_1 - v_C & q_2 - \mu_C & q_3 - \mu_C \\ 1 & 1 & 1 \end{vmatrix}, \Phi = \begin{vmatrix} \mu - h(\mu, v, k) - \mu_C \\ v - v(\mu, v, k) - v_C \\ 1 \end{vmatrix}$$

$$P = |I(p_1, q_1, k) \quad I(p_2, q_2, k) \quad I(p_3, q_3, k)|, \Xi = |I^*(\mu, v, k)|$$

Should $\mu_c$ ever be less than zero or greater than $M-1$, or $v_c$ less than zero or greater than $N-1$, (which can occur at the edges of the image), the nearest three pixel locations within the bounds of the secondary color plane that form a triangle are used, and extrapolation rather than interpolation occurs in determining the values $I^*(\mu,\nu,\kappa)$. Two revised secondary planes are formed from this process, where the interpolated (or extrapolated) values $I^*(\mu,\nu,\kappa)$ replace the corresponding original values $I(\mu,\nu,\kappa)$.

Using the two revised secondary planes, in place of the original secondary planes and in conjunction with the reference plane, accomplishes removal of substantially all color plane misregistration from the digitized image; the two revised secondary planes and the reference plane form the reregistered image.

The small systematic imperfections inherent in even the best scanners tend to produce very repeatable misregistration. Because of this repeatability, once spatial offsets for reregistering each pixel of the image of the test scene have been computed, they can be applied in an identical manner to the image of any other physical scene that is focused in a like manner on the imaging plane of a particular scanner. Thus, the spatial offsets computed from the image of the test scene serve as calibrated spatial offsets for other images captured by the same scanner.

Figure 6:
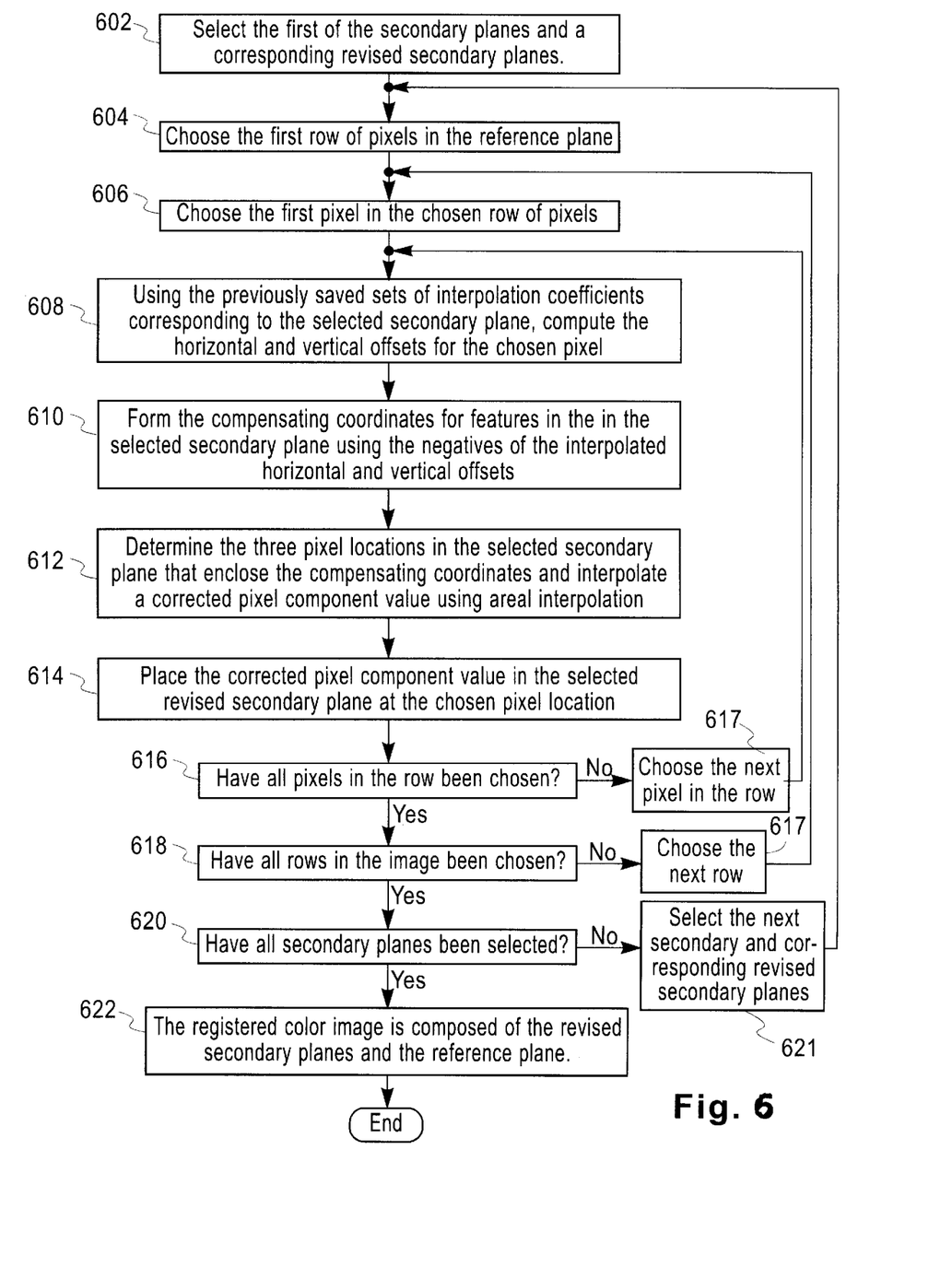
FIG. 6 shows an example of an overview of the steps of reregistering a scanned image in accordance with the present invention.

An overview of the steps of reregistering a scanned image is shown in FIG. 6. First, one of the secondary color planes and a corresponding revised secondary color plane are selected, 602. There is a one-to-one spatial correspondence between a secondary color plane and its revised secondary color plane. Then the first row of pixels in the selected secondary plane is chosen, 604, and the first pixel in that row is chosen, 606. Using the previously saved sets of interpolation coefficients that correspond to the selected secondary color plane, the horizontal and vertical offsets at the chosen pixel location are computed, 608. The compensating coordinates for features in the selected secondary plane are computed using the negatives of the interpolated horizontal and vertical offsets, 610. The three pixel locations in the secondary plane that surround the compensating coordinates are selected, and a corrected pixel color component is determined by areal interpolation, or bilinear interpolation, or any other appropriate form of interpolation, that uses the surrounding pixel locations and the pixel color components that correspond to them, 612. The corrected pixel color component is inserted into the selected revised secondary plane at the chosen pixel location, 614.

A test is made to determine if all pixels in the chosen row have been processed, 616, and if not true, the next sequential pixel location in the row is chosen, 617, and the steps 608–616 are repeated. Otherwise, a test is made to determine if all rows of the selected secondary color plane have been processes, 618, and if not true, the next sequential row of the selected color image is chosen, 619, and steps 606–618 are repeated. Otherwise, a test is made to determine if all secondary planes have been chosen, 620, and if not true, the next secondary color plane and its corresponding revised secondary color plane are selected, 621, and steps 604–620 are repeated. Otherwise, the image reregistration process is complete with the reregistered image being composed of the reference color plane and the revised secondary color planes, which replace their corresponding secondary color planes, 622.

An aspect of the present invention is a method for reregistering a plurality of color planes representing an image, each color plane having a plurality of pixels, each pixel having a first set of data values of an intensity of irradiated light of its respective color. The method comprising: choosing one of the color planes as a reference plane in respect to which a two-dimensional plane registration offset is determined; choosing a plurality of reference points on the reference plane; computing two-dimensional offsets of each other color plane with respect to the reference plane at each of the reference points; performing a first interpolation of the two-dimensional offsets of the reference points to obtain a first pixel offset and a second pixel offset for each of the pixels on the other color planes, and forming a reregistered set of data values for all pixels in each of the other color planes.

In an example embodiment of the method there is a red color plane, a green color plane and a blue color plane; and/or the method further comprises: forming the first set of data values using a scanning device having a group of device settings, and using the two-dimensional offsets to reregister another image having a second set of data values formed with the scanning device at conditions similar to the group of device settings; and/or the first offset is a vertical offset and the second offset is a horizontal offset; and/or the reference points are chosen to be at dispersed locations; and/or the step of forming includes: using the two-dimensional offsets to determine coordinates of compensating corrections for features in the secondary planes, and based upon the compensating coordinates, the step of forming includes, performing a second interpolation to obtain the reregistered set of data values; and/or the second interpolation is performed using areal interpolation.

Another aspect of the present invention is a method for reregistering a plurality of color planes having a plurality of pixels representing a digitized image, the method comprising: setting one of the color planes to be a reference plane and the remaining color planes to be secondary planes; measuring a plurality of two-dimensional position offsets of features in each of the secondary planes with respect to the features in the reference plane using groups of selected pixels; and adjusting an amount of misregistration at all pixel locations of the pixels in each secondary plane using the measured two-dimensional position offsets.

In an example embodiment, the step of measuring includes forming a partition defining each group of selected pixels, and wherein the step of measuring includes using forward and reverse discrete Fourier transforms operating on the partition; and/or the method further comprises the step of forming includes forming polygons of pixels from groups of partitions such that each of the polygons has edges defined to include both pixels within and pixels surrounded by one of the groups of partitions, and repeating the steps of measuring and adjusting for a plurality of partitions; and/or further comprises the step of repeating the steps of measuring and adjusting for a plurality of polygons. In some embodiments the plurality of polygons encompass the image, and/or the polygons are non-overlapping, and/or the number of partitions is four and the polygon is a rectangle; and/or each of the partitions forming one partition group is abutting at least one other partition of said one partition group.

In some example embodiments, the step of adjusting includes computing a set of coefficients of a bilinear interpolation formula using the values of the two-dimensional position offsets and a plurality of coordinates defining a location for each of the selected pixels, and/or each partition has a first number of rows of pixels and a second number of columns of pixels such that the second number is equal to the first number.

In further example embodiments, the method further comprises: calculating an average value of a horizontal and vertical misregistration offsets of features in each secondary plane with respect to the features in the reference plane for each corresponding partition; placing each average value to represent the average offset at a center two-dimensional position of each corresponding partition; and forming for all color planes a plurality of identical polygons, wherein each polygon is formed from a group of adjacent partitions; using the average value and coordinates of the center two-dimensional position of each of the partitions included in each polygon to obtain for each of the secondary planes a linearly interpolated measure of the horizontal and vertical misregistration offsets of the features for all pixels included in each polygon; and/or the method further comprises repeating the steps of measuring and adjusting for a plurality of polygons that encompass the image; and/or the step of selecting is performed such that the polygons are abutting but not overlapping; and/or the step of selecting is performed such that each of the polygons is a rectangle. In still another example embodiment of the present invention is a method for reregistering a plurality of color planes representing a scanned image wherein the step of interpolating employs bilinear interpolation.

Another aspect of the present invention is a system for improving the appearance of a replication of an image represented by a plurality of color planes. The system comprising: means for selecting one of the color plane to be a reference plane and the other color planes to be secondary planes; means for computing a plurality of spatial offsets of features in the image appearing in each of the secondary color planes relative to the two-dimensional position of the same features in the reference plane; means for spatially offsetting the pixels of the secondary color planes relative to those of the reference based on the spatial offsets computed.

In example embodiments the system further comprising means for scanning for producing the plurality of color planes, the means for scanning having a group of scanning settings; and/or each color plane has a plurality of pixels having data representing a brightness level of the image; and/or the step of locating employs interpolation; and/or the means for spatially offsetting is capable of using the spatial offsets computed, to reregister another image having another set of color planes produced by the means for scanning at conditions similar to the group of scanning settings.

Still another aspect of the present invention is an article of manufacture comprising a computer usable medium having computer readable program code means embodied therein for reregistering a plurality of color planes, each color plane having a first set of data values of an intensity of irradiated light of its respective color for each of a plurality of pixels representing an image, the computer readable program code means in said article of manufacture comprising computer readable program code means for causing the computer to effect: choosing one of the color planes as a reference plane in respect to which a two-dimensional plane registration offset is determined; choosing a plurality of reference points on the reference plane; computing two-dimensional offsets of each other color plane with respect to the reference plane at each of the reference points; performing a first interpolation of the two-dimensional offsets of the reference points to obtain a first pixel offset and a second pixel offset for each of the pixels on the other color planes, and forming a reregistered set of data values for all pixels in each of the other color planes.

In some embodiments the article of manufacture, further comprises computer readable program code means for causing the computer to effect: forming the first set of data values using a scanning device having a group of device settings, and using the two-dimensional offsets to reregister another image having a second set of data values formed with the scanning device at conditions similar to the group of device settings; and/or further comprises computer readable program code means for causing the computer to effect: forming the first set of data values using a scanning device having a group of device settings, and using the two-dimensional offsets to reregister another image having a second set of data values formed with the scanning device at conditions similar to the group of device settings.

Still another aspect of the present invention is a program storage device readable by machine, tangibly embodying a program of instructions executable by the machine to perform method steps for reregistering a plurality of color planes, each color plane having a first set of data values of an intensity of irradiated light of its respective color for each of a plurality of pixels representing an image, the method comprising: choosing one of the color planes as a reference plane in respect to which a two-dimensional plane registration offset is determined; choosing a plurality of reference points on the reference plane; computing two-dimensional offsets of each other color plane with respect to the reference plane at each of the reference points; interpolating the two-dimensional offsets of the reference points to obtain a first pixel offset and a second pixel offset for each of the pixels on the other color planes, and forming a reregistered set of data values for each of the other color planes.

In some example embodiments, the invention includes a program storage device readable by machine, tangibly embodying a program of instructions executable by the machine to perform method steps, the method steps, further comprising: forming the first set of data values using a scanning device having a group of device settings, and using the two-dimensional offsets to reregister another image having a second set of data values formed with the scanning device at conditions similar to the group of device settings.

Still another aspect of the present invention is a computer program product comprising a computer usable medium having computer readable program code means embodied therein for causing reregistering of a plurality of color planes having a plurality of pixels representing a digitized image, the computer readable program code means in said computer program product comprising computer readable program code means for causing a computer to effect the method comprising: setting one of the color planes to be a reference plane and the remaining color planes to be secondary planes; measuring a plurality of two-dimensional position offsets of features in each of the secondary planes with respect to the features in the reference plane using groups of selected pixels; and adjusting an amount of misregistration at all pixel locations of the pixels in each secondary plane using the measured two-dimensional position offsets. In example embodiments of the computer program product, the computer readable program code means further comprises computer readable program code means for causing a computer to effect the method such that the step of measuring includes forming a partition defining each group of selected pixels, and wherein the step of measuring includes using forward and reverse discrete Fourier transforms operating on the partition; and/or the computer readable program code means in the computer program product further comprises computer readable program code means for causing a computer to effect the method such that the step of forming includes forming polygons of pixels from groups of partitions such that each of the polygons has edges defined to include both pixels within and pixels surrounded by one of the groups of partitions, the method further comprising repeating the steps of measuring and adjusting for a plurality of partitions; and/or the computer readable program code means in the computer program product further comprising computer readable program code means for causing a computer to effect the method such that the method further comprises the step of repeating the steps of measuring and adjusting for a plurality of polygons; and/or the computer readable program code means in said computer program product further comprising computer readable program code means for causing a computer to effect the method such that the plurality of polygons encompass the image; and/or the computer readable program code means in said computer program product further comprising computer readable program code means for causing a computer to effect the method such that the polygons are non-overlapping; and/or the computer readable program code means in said computer program product further comprising computer readable program code means for causing a computer to effect the method such that the number of partitions is four and the polygon is a rectangle and wherein the step of adjusting includes computing a set of coefficients of a bilinear interpolation formula using the values of the two-dimensional position offsets and a plurality of coordinates defining a location for each of the selected pixels; and/or the computer readable program code means in said computer program product further comprising computer readable program code means for causing a computer to effect the method such that each partition has a first number of rows of pixels and a second number of columns of pixels such that the second number is equal to the first number, and the method further comprises: calculating an average value of a horizontal and vertical misregistration offsets of features in each secondary plane with respect to the features in the reference plane for each corresponding partition, placing each average value to represent the average offset at a center two-dimensional position of each corresponding partition, and forming for all color planes a plurality of identical polygons, wherein each polygon is formed from a group of adjacent partitions, and using the average value and coordinates of the center two-dimensional position of each of the partitions included in each polygon to obtain for each of the secondary planes a linearly interpolated measure of the horizontal and vertical misregistration offsets of the features for all pixels included in each polygon; and/or the computer readable program code means in said computer program product further comprising computer readable program code means for causing a computer to effect the method further comprising repeating the steps of measuring and adjusting for a plurality of polygons that encompass the image, and the step of selecting is performed such that the polygons are abutting but not overlapping; and/or the computer readable program code means in said computer program product further comprising computer readable program code means for causing a computer to effect the method such that the step of selecting is performed such that each of the polygons is a rectangle.

A further aspect of the present invention is a system for improving the appearance of a replication of an image represented by a plurality of color planes. The system comprising: a selector for selecting one of the color plane to be a reference plane and the other color planes to be secondary planes; a processor for computing a plurality of spatial offsets of features in the image appearing in each of the secondary color planes relative to the two-dimensional position of the same features in the reference plane; a reregistering module for spatially offsetting the pixels of the secondary color planes relative to those of the reference based on the spatial offsets computed.

In some embodiments the system further comprises a scanner for producing the plurality of color planes, the scanner has a particular group of scanner settings; and/or the reregistering module is capable of using the spatial offsets computed to register another image having another set of color planes produced by the scanner at conditions similar to the group of scanner settings; and/or each color plane has a plurality of pixels having data representing a brightness level of the image.

It is emphasized that in the method, product, article and/or system of the present invention, the scanning settings for obtaining color planes for another image need only be similar to the original scanning settings used to obtain the spatial offsets computed. It need not be identical to the original scanning settings. It is however noted, it is expected that a better reregistration of the other image will result when the scanning settings are more nearly identical.

It is noted that although the description of the invention is made for particular arrangements of steps, the intent and concept of the present invention are suitable and applicable to other arrangements. It will be clear to those skilled in the art that other modifications to the disclosed embodiments can be effected without departing from the spirit and scope of the invention.

What is claimed is:

1. A method for reregistering a plurality of color planes representing an image, each color plane having a plurality of pixels, each pixel having a first set of data values of an intensity of irradiated light of its respective color, the method comprising:

choosing one of the color planes as a reference plane in respect to which a two-dimensional plane registration offset is determined, and setting the remaining color planes to be secondary planes;

choosing a plurality of reference points on the reference plane;

computing two-dimensional offsets of each of the secondary planes with respect to the reference plane at each of the reference points;

performing an interpolation of the two-dimensional offsets of the reference points to obtain a first pixel offset and a second pixel offset for each of the pixels on each secondary plane, wherein the interpolation includes forming a partition defining each group of selected pixels in the reference plane and correspondingly in each secondary plane, and includes using forward and reverse discrete Fourier transforms operating on the partition; and forming a reregistered set of data values for all pixels in each of the secondary planes.

2. A method as recited in claim 1, wherein there is a red color plane, a green color plane and a blue color plane.

3. A method as recited in claim 1, further comprising:

forming the first set of data values using a scanning device having a group of device settings; and using the two-dimensional offsets to reregister another image having a second set of data values formed with the scanning device at conditions similar to the group of device settings.

4. A method as recited in claim 1, wherein the first offset is a vertical offset and the second offset is a horizontal offset.

5. A method as recited in claim 1, wherein the reference points are chosen to be at dispersed locations.

6. A method as recited in claim 1, wherein the step of forming includes:

using the two-dimensional offsets to determine coordinates of compensating corrections for features in the secondary planes; and based upon the compensating coordinates, the step of forming includes, performing a second interpolation to obtain the reregistered set of data values.

7. A method as recited in claim 6, wherein the second interpolation is performed using areal interpolation.

8. A method for reregistering a plurality of color planes representing a scanned image, the method comprising:

a) selecting a first of a plurality of secondary planes as a next secondary plane, wherein each secondary plane is formed by a plurality of rows, each row having a plurality of pixels;

b) setting a row of pixels in a reference plane as being a next row;
c) choosing a pixel in the next row as being a next pixel;
d) using the sets of interpolation coefficients corresponding to the selected secondary plane for computing the horizontal and vertical offsets for the next pixel;
e) forming a plurality of compensating coordinates for features in the selected secondary plane using a plurality of negatives of the interpolated horizontal and vertical offsets;
f) computing three pixel locations in the selected secondary plane that enclose the compensating coordinates;
g) interpolating to form a corrected pixel component value;
h) placing the corrected pixel component value in the selected revised secondary plane at the next pixel location;
i) determining if all pixels in the row have been chosen to be the next pixel;
   if not all pixel in the row have been chosen to be the next pixel;
j) choosing an adjacent pixel to be the next pixel in the row;
k) repeating the steps of (d) through (i) for the next pixel;
   if all pixels in the chosen row have been chosen to be the next pixel;
l) determining if all rows in the image have been set to be the next row;
   if not all rows in the image have been set to be the next row,
m) choosing the next row;
n) repeating the steps of (c) through (l) for the next pixel in the next row;
   if all rows in the image have been set to be the next row,
o) determining if all secondary planes have been selected;
   if not all secondary planes have been selected,
p) selecting the next secondary and the next corresponding revised secondary plane;
q) repeating the steps of (b) through (p) for the next secondary plane and the next corresponding revised secondary plane;
   if all secondary planes have been selected,
r) reregistering the scanned image as being composed of a plurality of revised secondary planes and the reference plane.

9. A method as recited in claim 8, wherein the step of interpolating employs bilinear interpolation.

10. An article of manufacture comprising a computer usable medium having computer readable program code means embodied therein for reregistering a plurality of color planes, each color plane having a first set of data values of an intensity of irradiated light of its respective color for each of a plurality of pixels representing an image, the computer readable program code means in said article of manufacture comprising computer readable program code means for causing the computer to effect:
   choosing one of the color planes as a reference plane in respect to which a two-dimensional plane registration offset is determined, and setting the remaining color planes to be secondary planes;
   choosing a plurality of reference points on the reference plane;
   computing two-dimensional offsets of each of the secondary planes with respect to the reference plane at each of the reference points;
   performing an interpolation of the two-dimensional offsets of the reference points to obtain a first pixel offset and a second pixel offset for each of the pixels on each secondary plane, wherein the interpolation includes forming a partition defining each group of selected pixels in the reference plane and correspondingly in each secondary plane, and includes using forward and reverse discrete Fourier transforms operating on the partition; and
   forming a reregistered set of data values for all pixels in each of the secondary planes.

11. An article of manufacture as recited in claim 10, further comprising computer readable program code means for causing the computer to effect:
   forming the first set of data values using a scanning device having a group of device settings; and
   using the two-dimensional offsets to reregister another image having a second set of data values formed with the scanning device at conditions similar to the group of device settings.

12. A program storage device readable by machine, tangibly embodying a program of instructions executable by the machine to perform method steps for reregistering a plurality of color planes, each color plane having a first set of data values of an intensity of irradiated light of its respective color for each of a plurality of pixels representing an image, the method comprising: comprising:
   choosing one of the color planes as a reference plane in respect to which a two-dimensional plane registration offset is determined, and setting the remaining color planes to be secondary planes;
   choosing a plurality of reference points on the reference plane;
   computing two-dimensional offsets of each of the secondary planes with respect to the reference plane at each of the reference points;
   interpolating the two-dimensional offsets of the reference points to obtain a first pixel offset and a second pixel offset for each of the pixels on each secondary plane, wherein the interpolation includes forming a partition defining each group of selected pixels in the reference plane and correspondingly in each secondary plane, and includes using forward and reverse discrete Fourier transforms operating on the partition; and
   forming a reregistered set of data values for all pixels in each of the secondary planes.

13. A program storage device readable by machine as recited in claim 12, wherein there is a red color plane, a green color plane and a blue color plane.

14. A method for reregistering a plurality of color planes representing an image, each color plane having a plurality of pixels, each pixel having a first set of data values of an intensity of irradiated light of its respective color, the method comprising:
   choosing one of the color planes as a reference plane in respect to which a two-dimensional plane registration offset is determined;
   choosing a plurality of reference points on the reference plane;
   computing two-dimensional offsets of each other color plane with respect to the reference plane at each of the reference points;
   performing a first interpolation of the two-dimensional offsets of the reference points to obtain a first pixel offset and a second pixel offset for each of the pixels on the other color planes;

forming a reregistered set of data values for all pixels in each of the other color planes;

forming the first set of data values using a scanning device having a group of device settings; and using the two-dimensional offsets to reregister another image having a second set of data values formed with the scanning device at conditions similar to the group of device settings.

15. A method for reregistering a plurality of color planes representing an image, each color plane having a plurality of pixels, each pixel having a first set of data values of an intensity of irradiated light of its respective color, the method comprising:

choosing one of the color planes as a reference plane in respect to which a two-dimensional plane registration offset is determined;

choosing a plurality of reference points on the reference plane;

computing two-dimensional offsets of each other color plane with respect to the reference plane at each of the reference points;

performing a first interpolation of the two-dimensional offsets of the reference points to obtain a first pixel offset and a second pixel offset for each of the pixels on the other color planes, and forming a reregistered set of data values for all pixels in each of the other color planes, wherein the step of forming includes:

using the two-dimensional offsets to determine coordinates of compensating corrections for features in the secondary planes; and based upon the compensating coordinates, the step of forming includes, performing a second interpolation to obtain the reregistered set of data values.

* * * * *